3,369,023
ANTHRAPYRIDONE DYESTUFFS
Guido R. Genta, Dunnstown, Lock Haven, Pa., assignor to American Aniline Products, Inc., a corporation of Delaware
No Drawing. Filed Sept. 20, 1966, Ser. No. 580,579
2 Claims. (Cl. 260—278)

This invention relates to anthrapyridone dyestuffs. In one specific aspect it relates to new anthrapyridones substituted with mercapto groups in the 4-position. The new dyes have remarkable affinity for polyester fibers and produce thereon greenish-yellow to golden-yellow shades.

Considerable effort has been expended in the dyestuffs industry in a search for suitable materials to color aromatic polyester fibers, in particular, polyethyleneterephthalate. Generally, the aromatic polyester fibers have a poor affinity for dyestuffs, since they do not readily absorb colorants from aqueous dispersions. As a result, it has been difficult to find dyes which are acceptable in all of the important physical properties of substantivity, light fastness, and resistance to sublimation. Many dyes which have passable affinity for polyester fibers and which color these materials yellow to orange shades having a reasonably satisfactory fastness to light, leave much to be desired with respect to their fastness to sublimation. Others are inferior from the standpoint of tinctorial strength or are limited in use by the method with which they can be effectively applied.

I have discovered a new class of anthrapyridone dyes which give outstanding over-all performance when dyed on aromatic polyester fibers, particularly on polyethyleneterephthalate. The affinity for the fiber, light fastness, and resistance to sublimation of my new anthrapyridone compounds is quite remarkable when considered in the light of the performance of the anthraquinone dyes ordinarily used for this purpose.

Other valuable features of my new dyes are their outstanding tinctorial strength and the ease with which they may be applied to polyesters by any of the conventional techniques, such as carrier dyeing or thermofixation. The increasing popularity of mixed fabrics, e.g., polyester/cotton, has made staining an important consideration for polyester colors. My new dyes are excellent in this respect since they do not stain cotton.

Thioaryloxyanthraquinones have been known for many years. It has been recently recognized in U.S. Patent 3,163,446 that certain dyes of this class are good colorants for hydrophobic textile materials, such as polyethyleneterephthalate. Among the thioaryloxyanthraquinones disclosed in the patent are compounds having an acylamino group in the 1-position, such as 1-acetylamino-4-p-tolylmercaptoanthraquinone. Although such compounds give satisfactory results in most respects when applied to hydrophobic textile materials, my heretofore unknown dyes are unexpectedly superior, particularly in their tinctorial strength, their resistance to sublimation, and in their dyeing of mixed fabrics.

It is therefore an object of the present invention to provide a new class of greenish-yellow to golden-yellow colors for polyester fibers.

In accordance with the invention I have discovered a new class of anthrapyridone dyes having the formula:

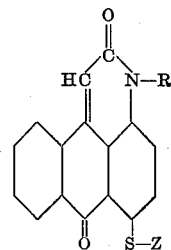

wherein R is a member selected from the group consisting of methyl and ethyl and Z is a member selected from the group consisting of

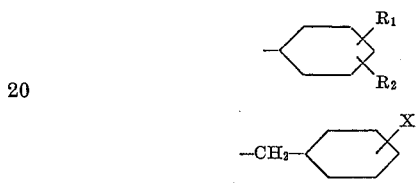

and —$CH_2(CH_2)_nOH$, wherein $R_1$ is a member selected from the group consisting of hydrogen, chlorine, bromine, and lower alkyl; $R_2$ is a member selected from the group consisting of hydrogen and lower alkyl; X is a member selected from the group consisting of hydrogen, chlorine, and bromine; and n is an integer having a value of 1–5.

The dyes of the invention are made by reacting a 4-halo-1:9(N)-alkylanthrapyridone with the appropriate mercaptan in the presence of a suitable halogen acceptor, such as potassium carbonate. The product is recovered from the reaction mixture by standard methods.

The anthrapyridone intermediates useful in making the dyes of the invention, e.g., 4-bromo-1:9(N)-methylanthrapyridone, and 4-bromo-1:9(N)-ethylanthrapyridone, are commercially available. If desired, these intermediates can be easily made by acetylation of 1-methylamino-4-bromoanthraquinone or 1-ethylamino-4-bromoanthraquinone with acetic anhydride in the presence of a trace of sulfuric acid as a catalyst. The resulting acetylalkylamino-4-bromoanthraquinone is ring-closed to form the desired intermediate by boiling with dilute caustic soda.

Mercaptans useful as intermediates for the dyes of the invention include thiophenol, o-, m-, and p-chlorothiophenol, o-, m- and p-bromothiophenol, p-methylthiophenol, p-t-butylthiophenol, mixed thioxylenols, benzylmercaptan, p-chlorobenzylmercaptan, p-bromobenzylmercaptan, mercaptoethanol, mercaptopropanol, and the like.

The dyes of the invention are made by reacting one mole of the anthrapyridone intermediate with one mole of the desired mercaptan in the presence of a polar organic solvent, preferably a solvent having a boiling point of at least 120° C. Useful solvents include ethylene glycol monomethyl ether, ethylene glycol monoethyl ether, n-amyl alcohol, Cellosolve acetate, diacetone alcohol, ethylene glycol, benzyl alcohol, diethylene glycol, butyl Cellosolve, sulfolane, dimethylformamide, dimethylacetamide, and the like. Lower boiling polar organic solvents, such as ethanol, can also be used for the reaction, but the use of such solvents places practical limits upon the reaction temperature that can be used.

The reaction takes place at a temperature between about 60° C. and the boiling point of the particular solvent used. At temperatures below about 60° C., the reaction does not proceed at a commercially useful rate. The preferred reaction temperature is between 100 and 140° C. If desired, the reaction can be carried out under an inert atmosphere, e.g., nitrogen gas, to protect the thiophenol from oxidation.

The reaction is carried out in the presence of a halogen acceptor, preferably an alkali metal hydroxide, an alkali metal carbonate, or an alkali metal acetate. Useful halogen acceptors include potassium hydroxide, sodium hydroxide, sodium carbonate, potassium carbonate, sodium acetate, and the like. At least one equivalent of halogen acceptor is required for each halogen present on the anthrapyridone intermediate. An excess of halogen acceptor can be used, but no particular advantage is obtained thereby.

The reaction generally takes from 10–30 hours. After the reaction is complete, the mixture is allowed to cool to ambient temperature. The product is separated by filtration and, if desired, washed with alcohol, water, or both.

The dyestuff is applied to textile fibers in the form of a dispersed color powder or paste, which is obtained by wet milling the dye in a conventional apparatus, such as a ball mill, with a dispersant, such as sodium lignin sulfonate; a wetting agent; and a suitable quantity of water. Sufficient diluent or standardizing agent is added to adjust the dyestuff to a standard strength. The dispersed cake or paste can also be spray dried or oven dried and thereafter micropulverized if desired. Sufficient dispersant and standardizing agents are added to give a dispersed powder generally containing between about 10–60 percent active (pure) dyestuff base. The dispersed powder, when added to water with or without auxiliary agents, forms a near colloidal aqueous dispersion in which the goods are dyed in the conventional manner.

My invention is further illustrated by the following examples:

*Example I*

To a 500 ml. flask equipped with heater, stirrer, thermometer, and reflux condenser there were charged 700 g. ethylene glycol monoethyl ether, 24 g. thiophenol, 28 g. potassium carbonate. The reaction mass was heated to 75° C. with stirring and 68 g. 4-bromo-1:9(N)-methylanthrapyridone was added at a slow rate. The temperature was raised to 110–115° C. and was maintained for a period of 16 hours. After cooling to 25° C., the reaction mass was filtered and the yellow needle-like crystals thus obtained were washed alkali free with cold water. A 60 g. quantity of substantially pure 4-thiophenoxy-1:9(N)-methylanthrapyridone was obtained. The product had a residual bromine content of 0.6 percent.

The 60 g. of pure dye was ball milled for 24 hours with 15 g. sodium lignin sulfonate dispersant available commercially as Marasperse N, 15 g. wetting agent, and 175 ml. of water.

The 22 percent paste thus obtained dyed Dacron polyester fiber in greenish-yellow shades with excellent resistance to sublimation and excellent light fastness by both the standard carrier dyeing and thermo-fixation methods. A notable feature of the new dye was its reserve (non-staining) of cotton when applied to mixed polyester/cotton fabrics.

*Example II*

To the 500 ml. flask equipped as described in Example I there were charged 250 ml. ethylene glycol monoethyl ether, 9 g. 4-t-butylthiophenol, and 7 g. potassium carbonate. The resulting mixture was heated to 75° C. and 17 g. of 4-bromo-1:9(N)-methylanthrapyridone was added slowly thereto. The mixture was heated for a period of 12 hours at 110–115° C. and thereafter cooled to room temperature. With agitation, the mixture was diluted with 100 ml. of ethanol. It was thereafter filtered and washed with alcohol, water, and 50 percent alcohol. Upon drying there was obtained 21.2 g. of substantially pure product. The dyestuff was acid pasted and standardized as described in Example I as a 10 percent paste. It dyed Dacron polyester fiber in a reddish to golden-yellow shade having very good sublimation properties and excellent light fastness.

*Example III*

To the 500 ml. flask equipped as described in Example I there were charged 250 ml. of ethanol, 7 g. benzylmercaptan, and 7 g. potassium carbonate. The mixture was heated to 70–75° C. and there were added 17 g. of 4-bromo-1:9(N)-methylanthrapyridone. The mixture was heated to reflux at 78–82° C. and held at this temperature for 16 hours. One hundred cc. of ethylene glycol monoethyl ether was added with stirring and the mass was cooled to room temperature. It was then filtered and washed with alcohol and water until it was alkali free. A 16 g. quantity of the desired product was obtained. The dyestuff was standardized as described in Example I as a 14 percent paste. It dyed Dacron polyester fiber in a reddish to golden-yellow shade having excellent sublimation properties and excellent light fastness.

*Example IV*

To the 500 ml. flask equipped as described in Example I there were charged 300 ml. ethylene glycol monoethyl ether, 10 g. mercaptoethanol, and 14 g. potassium carbonate. The mixture was heated to 70–75° C. and there was slowly added 34 g. 4-bromo-1:9(N)-methylanthrapyridone. The temperature was raised to 110–115° C. and held overnight. After cooling to room temperature, the mass was filtered, washed with 50 percent alcohol and water until alkali free, and thereafter dried. There was thus obtained 28.5 g. of yellow crystals. The dyestuff was standardized as described in Example I. It dyed Dacron polyester fiber in a yellow shade having excellent sublimation properties and excellent light fastness.

*Examples V–X*

By following the procedure described in Example I with the mercaptan shown below in Table I, the following results are obtained:

TABLE I

| Example No. | Reactant | Product | Fastness on Polyester | |
|---|---|---|---|---|
| | | | Light | Sublimation |
| V | p-Chlorothiophenol | 4-(p-chlorothiophenoxy)-1:(N)-methylanthrapyridone | Excellent | Excellent. |
| VI | p-Bromothiophenol | 4-(p-bromothiophenoxy)-1:9(N)-ethylanthrapyridone | do | Do. |
| VII | p-Methylthiophenol | 4-(p-methylthiophenoxy)-1:9(N)-methylanthrapyridone | do | Do. |
| VIII | Mixed thioxylenols | 4-(thioxyloxy)-1.9(N)-methylanthrapyridine | do | Very good. |
| IX | Mercaptopropanol | 4-(thiohydropropoxy)-1:2(N)-methylanthrapyridone | do | Excellent. |
| X | p-Chlorobenzylmercaptan | 4-(p-chlorobenzylmercapto)-1:9(N)-methylanthrapyriodone | do | Do. |

I claim:
1. A dye of the formula:
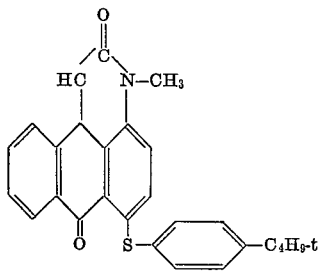
2. A dye of the formula:
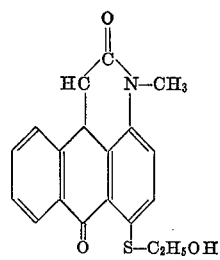
References Cited
UNITED STATES PATENTS
2,642,444  6/1953  Randall et al. ------ 260—278
3,126,280  3/1964  Blout et al. -------- 260—278
3,164,436  1/1965  Altermatt ---------- 260—369
ALEX MAZEL, *Primary Examiner.*
D. G. DAUS, *Assistant Examiner.*

UNITED STATES PATENT OFFICE
CERTIFICATE OF CORRECTION

Patent No. 3,369,023                      February 13, 1968

Guido R. Genta

It is hereby certified that error appears in the above numbered patent requiring correction and that the said Letters Patent should read as corrected below.

Column 5, lines 1 to 10, the formula should appear as shown below instead of as in the patent:

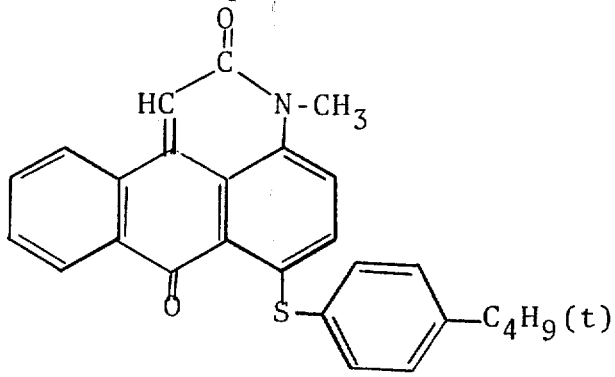

column 6, lines 1 to 10, the formula should appear as shown below instead of as in the patent:

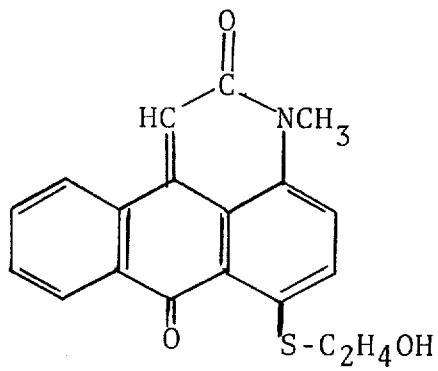

Signed and sealed this 13th day of May 1969.

(SEAL)
Attest:

EDWARD M. FLETCHER, JR.
Attesting Officer                      Commissioner of Patents